Oct. 20, 1931.  W. A. CHRYST  1,828,394

SHOCK ABSORBER

Filed April 17, 1930

Inventor

WILLIAM A. CHRYST

By Spencer, Hardman and Fehr

Attorneys

Patented Oct. 20, 1931

1,828,394

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed April 17, 1930. Serial No. 444,993.

This invention relates to improvements in shock absorbers.

It is among the objects of the present invention to provide a shock absorber with a connecting means between the fluid displacement and the operating member which will substantially reduce wear to a minimum.

Further objects and advantages of the present invention will be apparent from the following description, reference being had to the accompanying drawings wherein a preferred embodiment of one form of the present invention is clearly shown.

Figure 1:
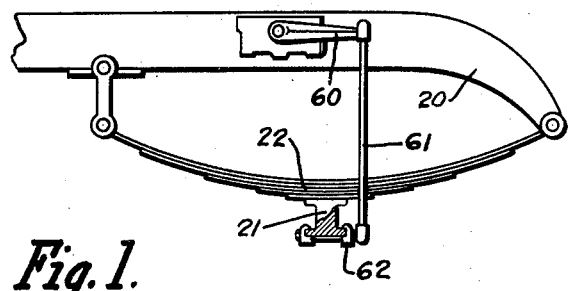
Fig. 1 is a side view of the front part of a motor vehicle chassis having a shock absorber embodying the present invention applied thereto.

Referring to the drawings, the numeral 20 designates the frame of the vehicle which is supported upon the vehicle axle 21 by springs 22, only one of which is shown. The shock absorber comprises a casing 23, presenting a fluid reservoir 24 and a cylinder 25. A fluid displacement member 26 forms a compression chamber at each end of the cylinder. The fluid displacement member 26 has a recess 27 intermediate its ends, said recess providing spaced and substantially parallel walls 28 and 29 respectively.

A shaft 30 is journalled in bearings 31 and 32 provided in the shock absorber casing 23. Shaft 30 has a lever 33 having a circularly shaped end 34. This free end 34 of the lever extends into the recess 27 formed in the fluid displacement member 26.

Figure 4:
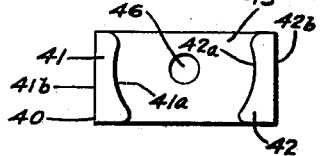
Figs. 4 and 5 are detail views of the member for connecting the fluid displacement member of the shock absorber with its operating member.
Figure 5:
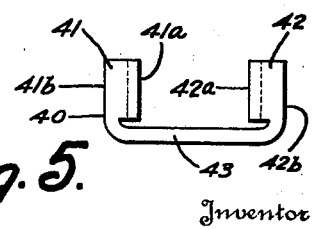

In order to connect the lever with the fluid displacement member so that a comparatively large surface contact is provided between them whereby wear is reduced to a substantial minimum, a saddle 40 is provided having two branch portions 41 and 42 substantially parallel and in spaced relation and connected together by a web portion 43. The inner or more adjacent surfaces of the branch portions 41 and 42 of the saddle are concaved as at 41a and 42a, said concaved surfaces fitting about the circularly shaped end 34 of the lever 33 whereby a substantially large surface contact is provided between the lever 33 and the saddle 40. The outer or more remote surfaces 41b and 42b of the branches 41 and 42 respectively are substantially flat and parallel as shown in the Figs. 4 and 5. The saddle fitting into the recess 27 of the fluid displacement member will have its outer parallel surfaces 41b and 42b slidably engaging the parallel walls 28 and 29 of the recess of the fluid displacement member so that a substantially large contacting surface is provided between the saddle 40 and the fluid displacement member 26. A hole 44 in the lever 33, substantially concentric with the circular edge 34 of the lever 33, receives a pin 45, the end of which extends from said lever and through an opening 46 in the saddle whereby said saddle is pivotally supported upon the lever 33 so that the concaved sides 41a and 42a of said saddle are substantially concentric of the circular end of the lever 33.

A port in each end of the piston is adapted to provide communication between the respective compression chambers and the reservoir 24. Each port is controlled by a spring-loaded valve, the one valve at the one end of the fluid displacement member being designated by the numeral 47, the other at the opposite end of the fluid displacement member by the numeral 48. The ports 49 and 50, leading from the respective compression chambers to the fluid reservoir 25, have spring-loaded valves 51 and 52 respectively which control the flow of fluid through these ports in such a manner that only when fluid pressures within the compression chambers reach a predetermined degree will said valves be operated to establish a restricted flow of fluid from the respective compression chambers to the reservoir. It will of course be understood that valves 47 and 48 in the fluid displacement member are adapted to establish substantially free flows of fluid from the reservoir into the compression chambers on certain strokes of the fluid displacement member.

Packing 55, urged into sealing engagement with the shaft 30 by the packing gland 56, substantially prevents fluid leaks at this part of the shock absorber. A cover 57 is secured to the casing 23 by screws 58 and closes the opening 59 in the casing through which the shaft 30 and its lever 33 are inserted in the casing.

A plug screw 157 closes the one open end of the cylinder 25, through which the fluid displacement member 26 is placed within the casing.

A shock absorber operating arm 60 is provided on the shaft 30, the free end of said arm being swivelly secured to a link 61, which is also attached to the axle 21 by a clamping bracket 62.

Figure 2:
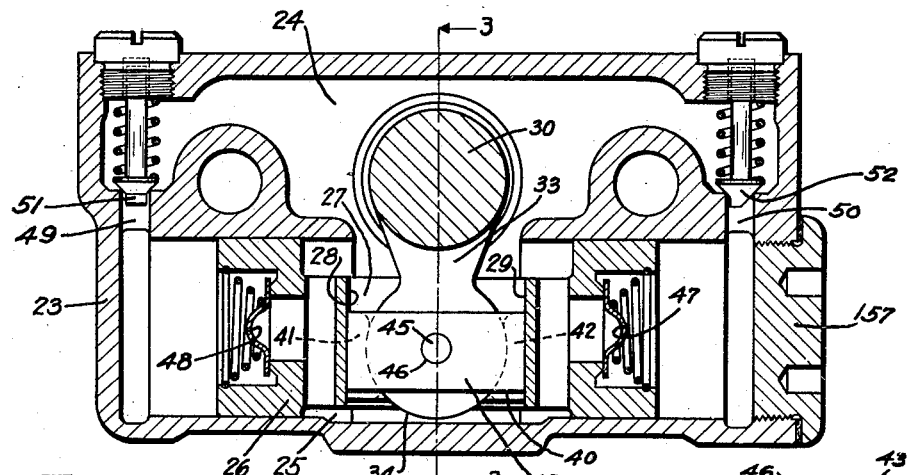
Fig. 2 is a longitudinal sectional view taken through the shock absorber.
Figure 3:
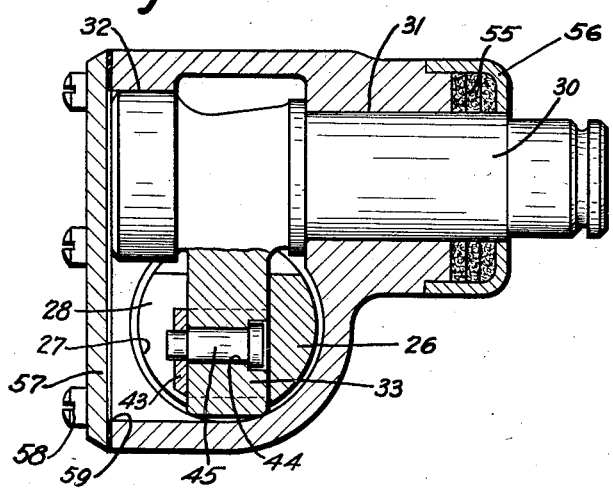
Fig. 3 is a transverse section taken along the line 3—3 of Fig. 2.

It will be seen that as the axle 21 is moved toward or away from the frame 20, the connecting link 61 will move the shock absorber shaft 30 counter-clockwise and clockwise respectively whereby the lever 33 through its saddle 40 will move the piston toward the right or left respectively as regards Fig. 2. If the circular end 34 of the lever 33 would directly engage the piston, a line contact would obtain which would tend to wear more quickly than when a saddle is provided, as in this invention, for the saddle has a substantially large surface contact with both the operating lever and the fluid displacement member, thereby distributing the forces over greater areas.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a cylinder; a piston in said cylinder; a lever for operating said piston, said lever being rotatably supported by the casing and having a rounded, free end; and a saddle for said lever, said saddle comprising opposite branches the adjacent sides of which are rounded to fit the rounded end of the lever, the outer, or more remote surfaces of said branches being substantially parallel and flat for engaging cooperating walls in the piston.

2. A shock absorber comprising, in combination, a casing presenting a cylinder; a piston in said cylinder, having a recess intermediate its ends, providing two substantially parallel walls; a lever for operating said piston, journalled in the casing, the free end of the lever having a circular, outer edge; and a saddle carried by the lever, said saddle having spaced branches the inner surfaces of which are concaved to fit upon the circular, outer edge of the lever, the outer surfaces of said branches being substantially flat and parallel for engagement with the parallel walls of the piston.

3. A shock absorber comprising, in combination, a casing presenting a cylinder; a piston in said cylinder, having a recess intermediate its ends, providing two substantially parallel walls; a lever for operating said piston, journalled in the casing, the free end of the lever having a circular, outer edge; and a saddle pivotally carried by the lever, said saddle having spaced branches the inner surfaces of which are concaved to fit upon the circular, outer edge of the lever, the outer surfaces of said branches being substantially flat and parallel for engagement with the parallel walls of the piston.

4. A shock absorber comprising, in combination, a casing presenting a cylinder; a piston in said cylinder, having a recess intermediate its ends, providing two substantially parallel walls; a lever for operating said piston, journalled in the casing, the free end of the lever having a circular, outer edge; a saddle comprising a U-shaped member having two parallel branch portions in spaced relation connected together by a web portion, the inner surfaces of said branch portions being concaved to fit upon the circular, outer edge of the lever, the outer surfaces of the respective branch portions being flat and substantially parallel and engaging the parallel walls of the recess in the piston; and a pin extending through alined holes in the free end of the lever and in the web portion of the saddle by which said saddle is pivotally secured to the lever.

5. A shock absorber comprising, in combination, a casing presenting a cylinder; a piston in said cylinder, having a recess intermediate its ends, providing two substantially parallel walls; a lever for operating said piston, journalled in the casing, the free end of the lever having a circular, outer edge; a saddle comprising a U-shaped member having two parallel branch portions in spaced relation connected together by a web portion, the inner surfaces of said branch portions being concaved to fit upon the circular, outer edge of the lever, the outer surfaces of the respective branch portions being flat and substantially parallel and engaging the parallel walls of the recess in the piston; and a pin extending through a hole in the lever, concentric with the circular, outer edge of the free end of said lever and through a hole in the web portion of the saddle, said pin pivotally securing the saddle to the lever.

In testimnoy whereof I hereto affix my signature.

WILLIAM A. CHRYST